(12) United States Patent
Genet

(10) Patent No.: US 9,321,431 B2
(45) Date of Patent: Apr. 26, 2016

(54) WINDSCREEN WIPER DEVICE

(75) Inventor: Sophie Genet, Saint Laurent sur Othain (FR)

(73) Assignee: Federal-Mogul S.A., Aubange (BE)

( * ) Notice: Subject to any disclaimer, the term of this patent is extended or adjusted under 35 U.S.C. 154(b) by 194 days.

(21) Appl. No.: 13/699,200

(22) PCT Filed: May 20, 2010

(86) PCT No.: PCT/EP2010/056984
§ 371 (c)(1),
(2), (4) Date: Feb. 4, 2013

(87) PCT Pub. No.: WO2011/144244
PCT Pub. Date: Nov. 24, 2011

(65) Prior Publication Data
US 2013/0125331 A1    May 23, 2013

(51) Int. Cl.
*B60S 1/40* (2006.01)
*B60S 1/38* (2006.01)

(52) U.S. Cl.
CPC ............... *B60S 1/40* (2013.01); *B60S 1/3849* (2013.01); *B60S 1/4006* (2013.01); *B60S 1/4009* (2013.01); *B60S 2001/4022* (2013.01); *B60S 2001/4035* (2013.01)

(58) Field of Classification Search
CPC .... B60S 1/3849; B60S 1/4006; B60S 1/4016; B60S 1/40; B60S 2001/4022; B60S 2001/4035
USPC ............ 15/250.32, 250.351, 250.31, 250.43, 15/250.44
See application file for complete search history.

(56) References Cited

U.S. PATENT DOCUMENTS 7,587,782 B2 *   9/2009   Inoue ........................ 15/250.32
2007/0289079 A1  12/2007  Van Bealen

FOREIGN PATENT DOCUMENTS

| CN | 1571742 A | 1/2005 |
|---|---|---|
| DE | 3434016 A1 * | 3/1986 |
| DE | 102007016479 A1 | 10/2008 |
| DE | 102008030250 A1 | 1/2009 |
| DE | 212007000044 U1 | 2/2009 |
| EP | 1621427 A1 | 2/2006 |
| FR | 2738201 A1 | 3/1997 |
| JP | 2005505465 A | 2/2005 |
| JP | 2005153701 A | 6/2005 |
| WO | 2008148265 A1 | 12/2008 |

OTHER PUBLICATIONS

Machine translation of description portion of German publication 102007016479, published Oct. 2008.*

* cited by examiner

*Primary Examiner* — Gary Graham
(74) *Attorney, Agent, or Firm* — Robert L. Stearns; Dickinson Wright, PLLC

(57) ABSTRACT

A windscreen wiper device includes an elastic, elongated carrier element, as well as an elongated wiper blade, which can be placed in abutment with a windscreen to be wiped, which wiper blade includes at least one longitudinal groove in which a longitudinal strip of the carrier element is disposed, which windscreen wiper device comprises a connecting device for an oscillating arm, wherein the oscillating arm is pivotally connected to the connecting device about a pivot axis near one end thereof, with the interposition of a joint part, wherein the windscreen wiper device comprises a cover element mounted movable onto the connecting device between a closed position wherein an open end of the connecting device is covered and an open position wherein the oscillating arm can be mounted onto or removed from the connecting device through the open end.

8 Claims, 3 Drawing Sheets

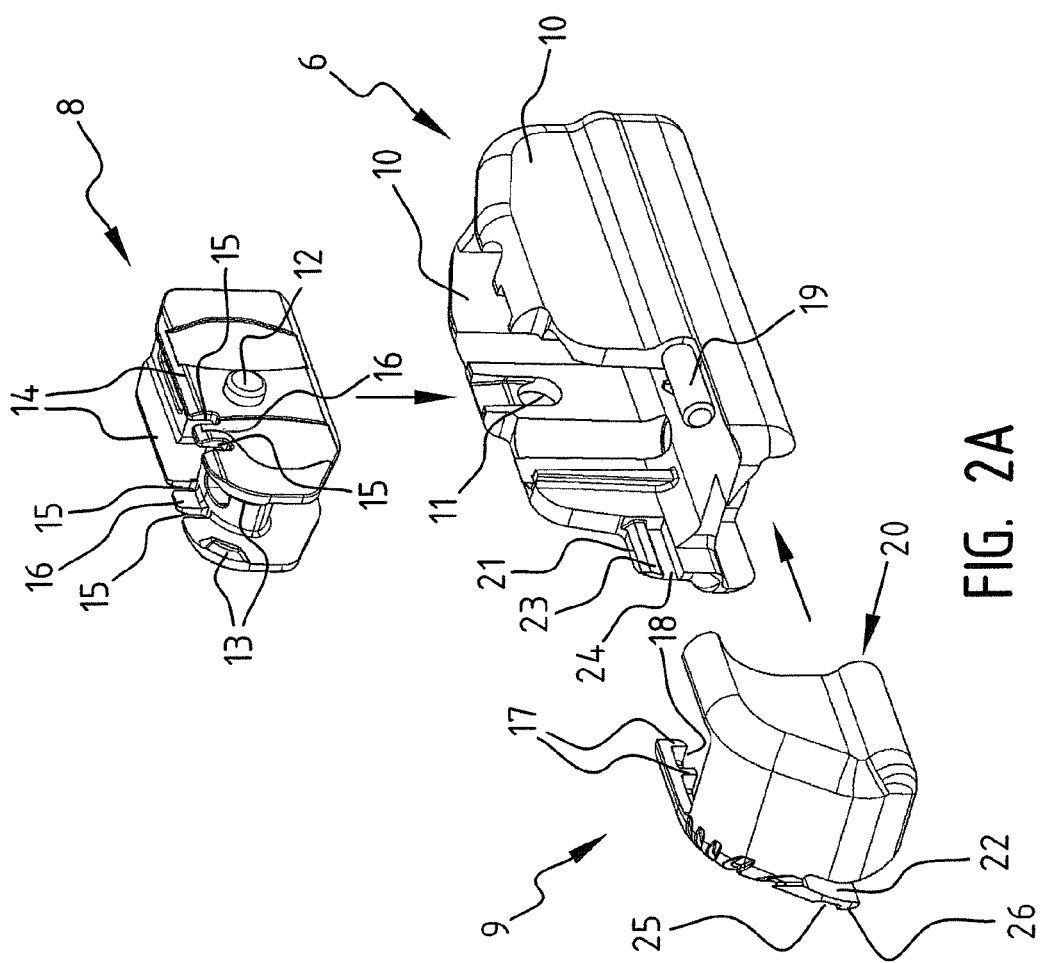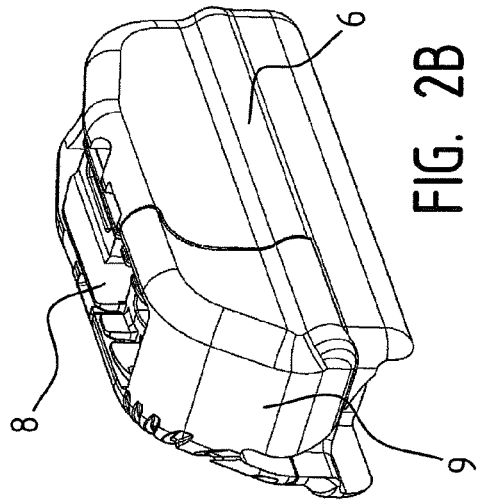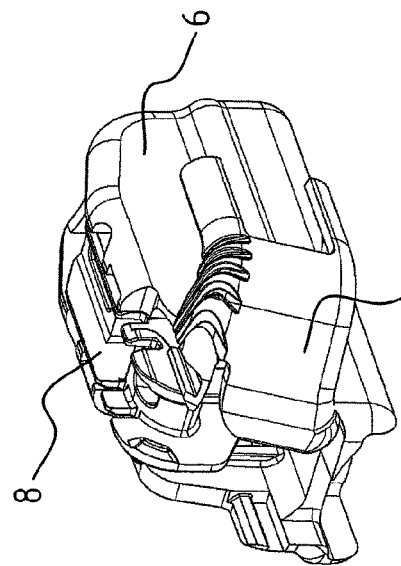

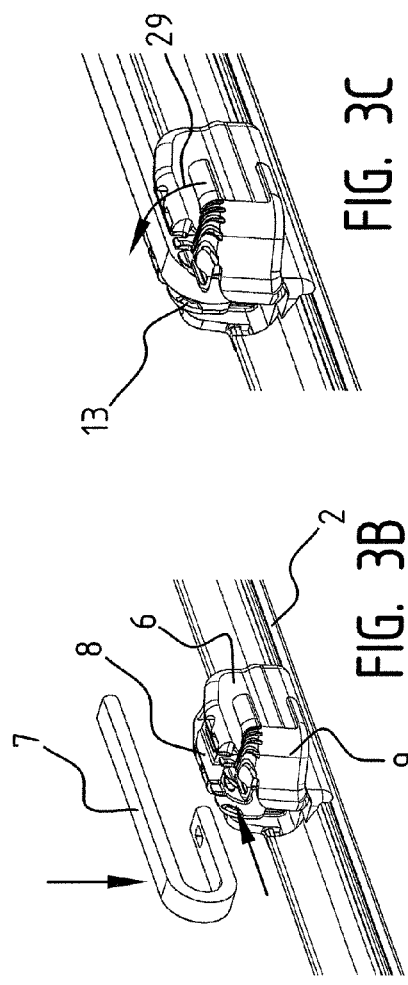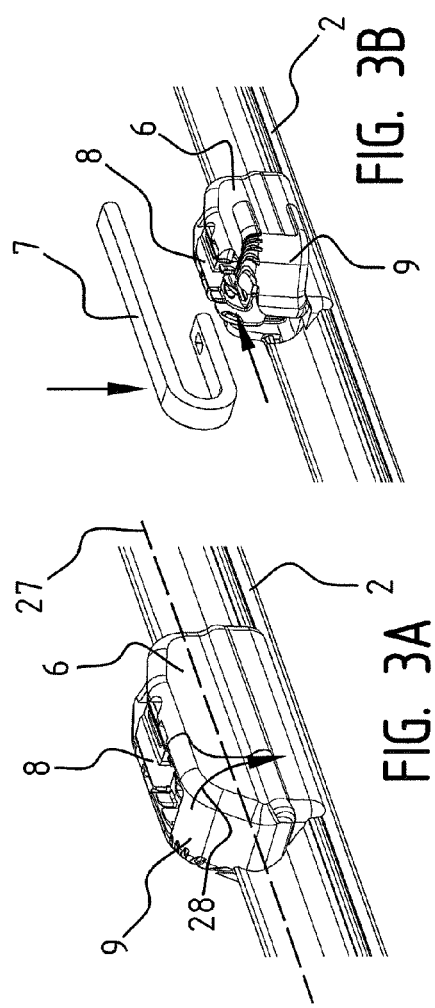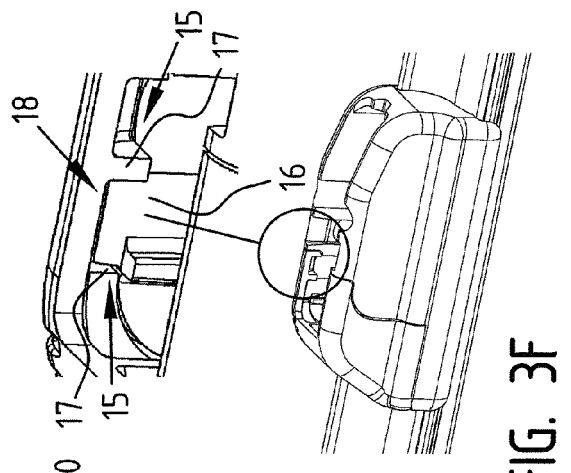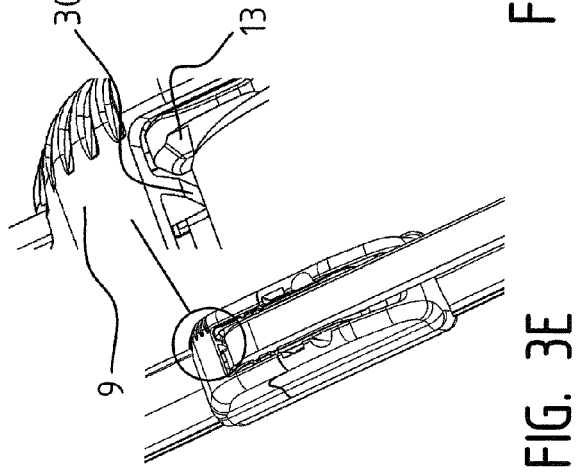

WINDSCREEN WIPER DEVICE

BACKGROUND OF THE INVENTION

1. Technical Field

The present invention relates to a windscreen wiper device comprising an elastic, elongated carrier element, as well as an elongated wiper blade, which can be placed in abutment with a windscreen to be wiped, which wiper blade includes at least one longitudinal groove in which a longitudinal strip of the carrier element is disposed, which windscreen wiper device comprises a connecting device for an oscillating arm, wherein the oscillating arm is pivotally connected to the connecting device about a pivot axis near one end thereof, with the interposition of a joint part.

2. Related Art

Such a windscreen wiper device is generally known. This prior art windscreen wiper device is designed as a so-called "flat blade" or "yokeless blade", wherein no use is made of several yokes pivotally connected to each other, but wherein the wiper blade is biassed by the carrier element, as a result of which it exhibits a specific curvature. In order to connect or disconnect the wiper blade onto the oscillating arm, one end of the connecting device is open to provide space for the introduction or removal of the oscillating arm. A disadvantage of the open end of the connecting device is that sharp edges can be present and/or that no protection against UV-light is provided.

SUMMARY OF THE INVENTION

It is an object of the invention to obviate this disadvantage, in the sense that a windscreen wiper device is presented that facilitates efficient and/or easy introduction and/or removal of the oscillating arm while sharp edges are avoided and/or a protection against UV-light is provided.

In order to accomplish that objective, a windscreen wiper device of the kind referred to in the introduction is characterized in that the windscreen wiper device comprises a cover element mounted movable onto the connecting device between a closed position wherein an open end of the connecting device is covered and an open position wherein the oscillating arm can be mounted onto or removed from the connecting device through the open end. An advantage of the cover element is that it can be easily moved between the closed position wherein sharp edges are avoided and/or wherein a protection against UV-light is provided and an open position wherein there is space for the introduction or removal of the wiper arm. Another advantage of such a cover element is that in the closed position an aesthetic appearance of the windscreen wiper device is provided and/or that in the closed position the wiper arm is locked onto the connecting device. Preferably the cover element is a cap.

In a preferred embodiment of a windscreen wiper device according to the invention the cover element is movable between the open and closed positions by rotation of the cover element about the longitudinal axis of the windscreen wiper device. An advantage of the rotation of the cover element about the longitudinal axis is that the cover element will not be moved to its open position even when a longitudinal force due to a shock is applied thereon, because the opening direction of the cover element is perpendicular to the longitudinal force performed thereon by the wiper arm in case of a shock.

In another preferred embodiment of a windscreen wiper device according to the invention the cover element comprises a locking element for locking the arm to the connecting device. An advantage of the locking element is that the wiper arm is locked onto the connecting device so that no longitudinal movement of the wiper arm is possible even when a force is applied thereon due to a shock. Preferably, the locking element is a rib.

In another preferred embodiment of a windscreen wiper device according to the invention the connecting device and the cover element comprise at least one of a mutually cooperating protrusion or recess for maintaining the cover element in closed position, With use of such cooperating parts the cover element can be thinly attached to the connecting device by clipping the cover element onto the connecting device.

In another preferred embodiment of a windscreen wiper device according to the invention the joint piece and the cover element comprise at least one of a mutually cooperating protrusion or recess for attaching the cover element to the joint part in the closed position. With use of such cooperating parts the cover element can be firmly attached to the joint part by clipping the cover element onto the joint part. Because the joint part is on itself firmly attached to the connecting device a firm connection is provided between all parts such that the oscillating arm will be finally kept in place in the connecting device even when a shock occurs.

THE DRAWINGS

The invention will now be explained in more detail with reference to figures illustrated in a drawing, wherein:

FIGS. 2A-2C are a perspective view of preferred embodiments of the connecting device, the joint piece and the cover element when they are disassembled (2A), assembled with the cover element in closed position (2B) and assembled with the cover element in open position (2C); and FIGS. 3A-3F show the introduction of a wiper arm in the windscreen wiper device of FIG. 1.

DETAILED DESCRIPTION

Figure 1:
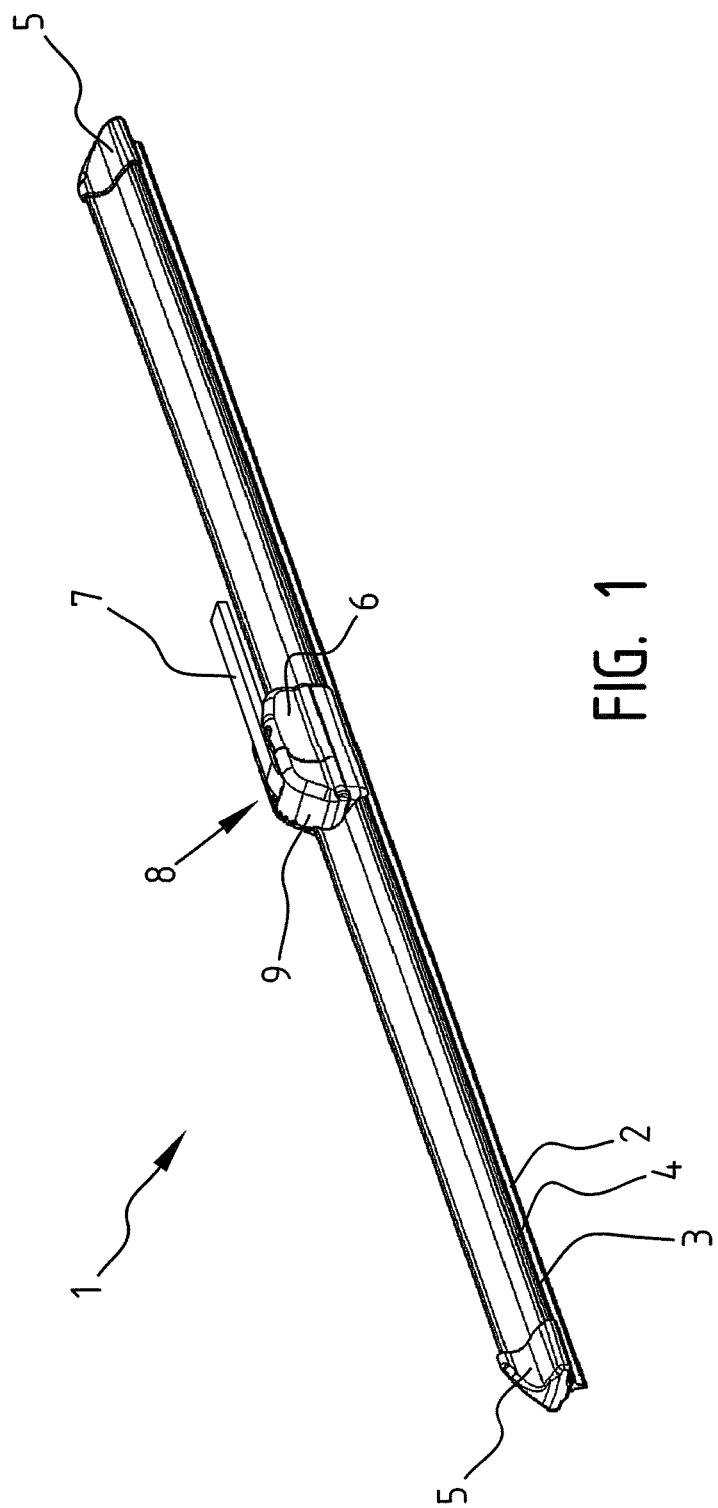
FIG. 1 is a perspective view of a windscreen wiper device according to the invention.

FIG. 1 shows a windscreen wiper device 1. The windscreen wiper device is built up of an elastomeric wiper blade 2 comprising longitudinal grooves 3, wherein longitudinal strips 4 made of spring band steel are fitted in the longitudinal grooves 3. The strips 4 form a flexible carrier element for the rubber wiper blade 2, as it were, which is thus biassed in a curved position (the curvature in operative position being that of a windscreen to be wiped). Neighbouring ends of the strips 4 (not shown) are interconnected on either side of the windscreen wiper device 1 to respective connecting pieces or "end caps" 5. The connecting pieces 5 could be separate constructional elements, which may be form-locked ("positive locking" or "having a positive fit") as well as force-locked to the ends of the strips 4. In another preferred variant, the connecting pieces 5 are in one piece with the strips 4 made of spring band steel.

The windscreen wiper device 1 is furthermore built up of a connecting device 6 for connecting an oscillating wiper arm 7 thereto, with the interposition of a joint part 8. A cover element in the form of a cap 9 is rotably mounted on the connecting device 6 for covering the open end of the connecting device 6 in order to obtain an aesthetic appearance thereof, to avoid sharp edges, to provide protection against UV-light and for locking the wiper arm 7 to the connecting device 6 etcetera. The connecting device 6, the joint part 8 and the cap 9 can be made of a plastic material or metal, such as steel or aluminum. The oscillating wiper arm 7 is pivotally connected to the connecting device 6 about a pivot axis near one end, as will be described hereunder.

With reference to FIG. 2A the connecting device 6 has a substantially U-shaped form with two side walls 10 and a bottom 10' that can be thinly attached to the wiper blade 2, for example by welding. Each side wall 10 comprises a cylindrical recess 11 at the location of the pivot axis for receiving cylindrical protrusions 12 extending outwards on either side of the joint part 8 in order to pivot the joint part 8 about the pivot axis near one end of the oscillating arm 7. The joint part 8 can be mounted on the connecting device 6 by clipping the protrusions 12 in the recesses 11.

As is shown in FIG. 2A, the joint part 8 comprises two protrusions 13 near one end of the joint part 8. The protrusions 13 keep the wiper arm 7 in the right position before the cap 9 is in its closed position. Each side wall 14 of the joint part 8 comprises two recesses 15 that cooperate with protrusions 17 of the cap 9 and a protrusion 16 that cooperates with a recess 18 of the cap 9 for guiding during closing of the cap 9 on the joint part 8.

When the joint part 8 is clipped onto the connecting device 6 the cap 9 can be mounted to the connecting device 6. As is shown in FIG. 2A the connecting device 6 comprises a cylindrical protrusion 19 extending in longitudinal direction from one end of the connecting device 6. The cap 9 comprises a cylindrical recess 20 extending in the longitudinal direction for receiving the protrusion 19 such that cap 9 can be rotably mounted onto the connecting device 6. In mounted position the cap 9 can be rotated between a closed position wherein the cap 9 covers the open end of the connecting device 6 (FIG. 2B) and an open position wherein the wiper arm 7 can be introduced or removed (FIG. 2C). The rotation of the cap 9 is about the longitudinal axis of the windscreen wiper device 1 (see also FIG. 3A). The connecting device 6 further comprises a protrusion in the form of an upwardly extending wall 21 which cooperates with a recess 22 in the cap 9, such that in the closed position the wall 21 extends in the recess 22 of the cap 9. For firmly locking the cap 9 to the connecting device 6 in the closed position the wall 21 comprises a sideways extending protrusion 23 and recess 24 that mutually cooperate with a recess 25 and a sideways extending protrusion 26 of the cap 9.

FIGS. 3A-3F show the steps of mounting the connecting device 6 with the wiper blade 2 onto the oscillating wiper arm 7. The joint part 8 and cap 9 are already clipped onto the connecting device 7. The cap 9 is rotated about the longitudinal axis 27 of the windscreen wiper device 1 in clockwise direction 28 from the closed position shown in FIG. 3A to the open position shown in FIG. 3B. In the open position the receiving end of the connecting device 6 is free for the introduction of the wiper arm 7. The U-shaped wiper arm 7 is clipped onto the joint part 8, such that protrusions 13 keep the wiper arm 7 in place (see FIG. 3C). After introduction of the wiper arm 7 the cap 9 is moved to its closed position by rotating the cap 9 in anti-clockwise direction until the cap 9 is firmly clipped onto both the connecting device 6 with use of the mutually cooperating protrusions 21, 23, 26 and recesses 22, 24, 25 and the joint part 8 with use of the mutually cooperating protrusions 16, 17 and recesses 15, 18 (see also FIG. 3F).

FIG. 3E shows that when the wiper arm 7 is in mounted position with the cap 9 closed, the wiper arm 7 is locked onto the connecting device 6 with use of a locking element in the form of a vertically extending rib 30. The rib 30 prevents the wiper arm 7 from moving in longitudinal direction even when a force due to a shock is applied thereon.

Note that due to the opening rotation of the cap 9 about the longitudinal axis 27, the cap 9 will not be moved to its open position even when a longitudinal force due to a shock is applied thereon, because the opening direction of the cap 9 is perpendicular to the longitudinal force performed thereon by the wiper arm 7. Therefore, the wiper arm 7 is firmly attached to the connecting device 6 even when a shock occurs.

The invention is not restricted to the variants shown in the drawing, but it also extends to other preferred embodiments that fall within the scope of the appended claims.

The invention claimed is:

1. A windscreen wiper device comprising an elastic, elongated carrier element, as well as an elongated wiper blade, which can be placed in abutment with a windscreen to be wiped, which wiper blade includes at least one longitudinal groove in which a longitudinal strip of the carrier element is disposed, which windscreen wiper device comprises a connecting device for an oscillating arm, wherein said oscillating arm is pivotally connected to said connecting device about a pivot axis near one end thereof, with the interposition of a joint part, wherein said windscreen wiper device comprises a cover element mounted onto said connecting device and pivotable about a longitudinal axis which extends at approximately ninety degrees to said pivot axis between a closed position wherein an open end of the connecting device is covered and an open position wherein the oscillating arm can be mounted onto or removed from the connecting device through said open end, wherein the cover element is U-shaped in cross-section with spaced side walls joined by a base wall, and wherein a rib extends perpendicularly from said base wall spaced between said side walls such that an edge end of said rib is adapted to trap the oscillating arm between said edge end and said joint part, wherein the base wall of the cover includes a U-shaped opening facing towards the joint part.

2. The windscreen wiper device according to claim 1, wherein the connecting device and the cover element have mutually cooperating protrusion and recess features for maintaining the cover element in closed position.

3. The windscreen wiper device according to claim 1, wherein the joint part and the cover element have mutually cooperating protrusion and recess features for guiding during closing of the cover element on the joint part.

4. The windscreen wiper device according to claim 1, wherein the cover element is a cap.

5. A windscreen wiper device comprising an elastic, elongated carrier element, as well as an elongated wiper blade, which can be placed in abutment with a windscreen to be wiped, a carrier element including at least one longitudinal strip, which windscreen wiper device comprises a connecting device and a joint part pivotally coupled to said connecting device for attachment with an oscillating arm, and including a cover element mounted movably by rotation about a longitudinal axis of the windscreen wiper device onto said connecting device between a closed position wherein an open end of said connecting device is covered and an open position wherein the oscillating arm can be mounted onto or removed from the connecting device through said open end, wherein the cover element is U-shaped in cross-section with spaced side walls joined by a base wall, and wherein a rib extends perpendicularly from said base wall and is spaced between said side walls such that an edge end of said rib is adapted to trap the oscillating arm between said edge end and said joint part, wherein the base wall of the cover includes a U-shaped opening facing towards the joint part.

6. The windscreen wiper device according to claim 5, wherein the connecting device and the cover element comprise at least one mutually cooperating protrusion and recess for maintaining the cover element in closed position.

7. The windscreen wiper device according to claim 6, wherein the joint part and the cover element comprise at least one mutually cooperating protrusion and recess for guiding during closing of the cover element on the joint part.

8. The windscreen wiper device according to claim 5, wherein the cover element is a cap.

\* \* \* \* \*